United States Patent
Kamoto et al.

(10) Patent No.: US 7,180,832 B2
(45) Date of Patent: Feb. 20, 2007

(54) MEDIA DRIVING APPARATUS

(75) Inventors: Satoru Kamoto, Maebashi (JP); Hiroshi Matsugase, Gunma-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 548 days.

(21) Appl. No.: 10/816,952

(22) Filed: Apr. 5, 2004

(65) Prior Publication Data

US 2004/0213110 A1    Oct. 28, 2004

(30) Foreign Application Priority Data

Apr. 25, 2003 (JP) .......................... P2003-120962

(51) Int. Cl.
*G11B 7/00* (2006.01)

(52) U.S. Cl. .................. 369/44.14; 369/44.32

(58) Field of Classification Search ............ 369/44.11, 369/44.12, 44.14, 44.15, 44.32, 44.21
See application file for complete search history.

(56) References Cited

U.S. PATENT DOCUMENTS 5,488,594 A * 1/1996 Kobayashi et al. ...... 369/44.14

FOREIGN PATENT DOCUMENTS

| JP | 11-283253 | 10/1999 |
| JP | 2001052345 A | 2/2001 |
| JP | 2002133797 A | 5/2002 |

* cited by examiner

*Primary Examiner*—Nabil Hindi
(74) *Attorney, Agent, or Firm*—Nath Law Group PLLC; Gregory B. Kang; Stanley N. Protigal

(57) ABSTRACT

A screw axis and a guide axis are provided in parallel in a base plate, and both sides of an optical pickup are supported by the screw axis and the guide axis. The base plate is provided with a first supporting portion for supporting one end portion of the screw axis in a side of a driven gear, and a second supporting portion for supporting another end portion of the screw axis. The first supporting portion has a first elastic member which presses the screw axis in an axial direction of a turn table, and the second supporting portion is provided with a second elastic member and a tilt adjusting screw which are opposed to each other with holding a collar therebetween in the axial direction of the turn table. One end portion of the screw axis is rotatably fitted to the collar, and the collar is pressed toward the tilt adjusting screw by the second elastic member.

3 Claims, 5 Drawing Sheets

MEDIA DRIVING APPARATUS

BACKGROUND OF THE INVENTION

1. Field of the Invention

The present invention relates to media driving apparatuses used to read/write signals on a disc-shaped media such as a CD, a DVD or the like, and more particularly to a media driving apparatus which can precisely and easily adjust a tilt of an optical axis of an optical pickup with respect to signals recording surface of the media.

2. Description of the Related Art

In conventional, there has been known a CD player, a DVD player, a DVD recorder or the like as the media driving apparatus. The media driving apparatus is provided with a turn table for rotating the disc-shaped media, and an optical pickup moves along a radial direction of the media mounted on the turn table. The optical pickup irradiates a laser beam to signals (Pits and Lands) recorded on a surface (hereinafter referred as an information recording surface) of the media, and detects with or without the pit in correspondence to a magnitude of a reflected light amount from the media. Accordingly, in the case that a tilt of the laser beam is large with respect to the information recording surface of the media, the reflected light cannot be received, and a reading error of the pit is generated. Therefore, the media driving apparatus as mentioned above is provided with an adjusting mechanism for setting a tilt (an incident angle of an optical axis) of the laser beam irradiated from the optical pickup within an acceptable range.

With reference to FIGS. 1 and 2, an embodiment of the adjusting mechanism mentioned above will be described below. Reference symbol D denotes a disc-shaped media, reference symbol T denotes a turn table for rotating the media D, reference symbol P denotes an optical pickup, reference symbol R denotes a screw axis for moving the optical pickup P, reference symbol M denotes a motor for driving so as to rotate the screw axis R, and reference symbol G denotes a guide axis for guiding the optical pickup P, respectively. A tilt adjusting screw N and an elastic member S are provided in both end portions of the guide axis G so as to oppose to each other, and a tilt of the guide axis G is adjusted with respect to the information recording surface of the media D by rotating each of the screws N.

After combining the respective parts mentioned above with each other, a pair of guide axes G are arranged in parallel to the information recording surface of the media D mounted on the turn table T by operating the tilt adjusting screw N. Based on this operation, it is possible to prevent the pit reading error from being occurred by irradiating the laser beam perpendicularly from the optical pickup P to the information recording surface of the media D.

However, in the structure in which the optical pickup P is supported by a pair of guide axes G, since a large number of the parts are needed, therefore there has been a problem that it is hard to make the apparatus compact and inexpensive. Further, in the case that an engagement between a rack L provided in the optical pickup P and the screw axis R is deteriorated by changing the tilt of a pair of guide axes G with respect to the information recording surface of the media D, there is rarely a risk that the optical pickup P cannot move.

According to another conventional media driving apparatus structured such that both sides of the optical pickup are supported by the screw axis and the guide axis, and the tilt of the screw axis can be adjusted with respect to the information recording surface of the media (for example, Japanese Patent Application Laid-open No. H11-283253).

However, in the structure in which one side of the optical pickup is supported by the screw axis which is driven so as to rotate, the rotation of the screw axis is resisted by pressing the tilt adjusting screw to an outer peripheral surface of the screw axis. As a result, not only an overload is generated in a driving source, but also an outer peripheral surface of the screw axis and a leading end of the tilt adjusting screw worn by the rotation of the screw axis, whereby there is a problem that the tilt of the screw axis gradually becomes large with respect to the information recording surface of the media. As a result, the laser beam irradiated to the information recording surface of the media from the optical pickup is tilted. And with the tilt becomes larger than the acceptable range, the pit reading error is occurred.

Accordingly, in the related art mentioned above, a traverse base plate is mounted to a main base plate to which a guide axis (a first guide rail) or the like is mounted, via a C-shaped spring. A screw axis (a feed screw) and a motor (a driving source) are arranged on the traverse base plate, and a tilt of the screw axis is adjusted by operating the screws inserted to two positions of the traverse base plate.

However, since the traverse base plate is provided on the main base plate, it is hard to make the apparatus compact. In addition, since the tilt of the screw axis is indirectly adjusted via the traverse base plate, an accuracy of the parts is required. Further, in addition, it is hard to adjust the tilt of the optical axis of the optical pickup with respect to the information recording surface of the media at a high accuracy, and it is hard to obtain a high adjusting accuracy with respect to a deflection of the traverse base plate. This point is disadvantageous in the case that the recording density of the media such as a Compact Disk, a DVD, becomes higher.

The present invention is made by taking the circumstances mentioned above into consideration, and an object of the present invention is to provide a media driving apparatus which can accurately and easily execute a tilt adjustment of an optical axis of an optical pickup with respect to an information recording surface of a media while making the apparatus compact.

SUMMARY OF THE INVENTION

In order to achieve the object mentioned above, according to the present invention, there is provided a media driving apparatus for moving an optical pickup in a radial direction of a disc-shaped media arranged on a turn table, comprising: a base plate; a screw axis and a guide axis which are provided in parallel to the base plate and support both sides of the pickup, in which the optical pickup moves in the radial direction of the disc-shaped media based on a rotation of the screw axis; a driving source which applies a rotation driving force to the screw axis; a driven gear which is provided in a first end portion side of the screw axis, and provided for obtaining the rotation driving force from the driving source; a bearing in which the screw axis is rotatably fitted to a second end portion side-of the screw axis; a first supporting portion which is mounted to the base plate and supports the first end portion side of the screw axis; a second supporting portion which is mounted to the base plate and supports the second end portion side of the screw axis; a first elastic member which is mounted to the first supporting portion and presses the screw axis in an axial direction of the turn table; a second elastic member which is mounted to the second supporting portion and presses the screw axis in the axial direction of the turn table via the bearing; and a tilt adjusting screw which is opposed to the second elastic member with respect to the bearing, wherein the bearing is displaced between the tilt adjusting screw and the second elastic member by operating the tilt adjusting screw so as to rotate, and a tilt of the screw axis is changed with respect to the information recording surface of the disc-shaped media in correspondence to an amount of displacement.

DETAILED DESCRIPTION OF THE INVENTION

Figure 3:
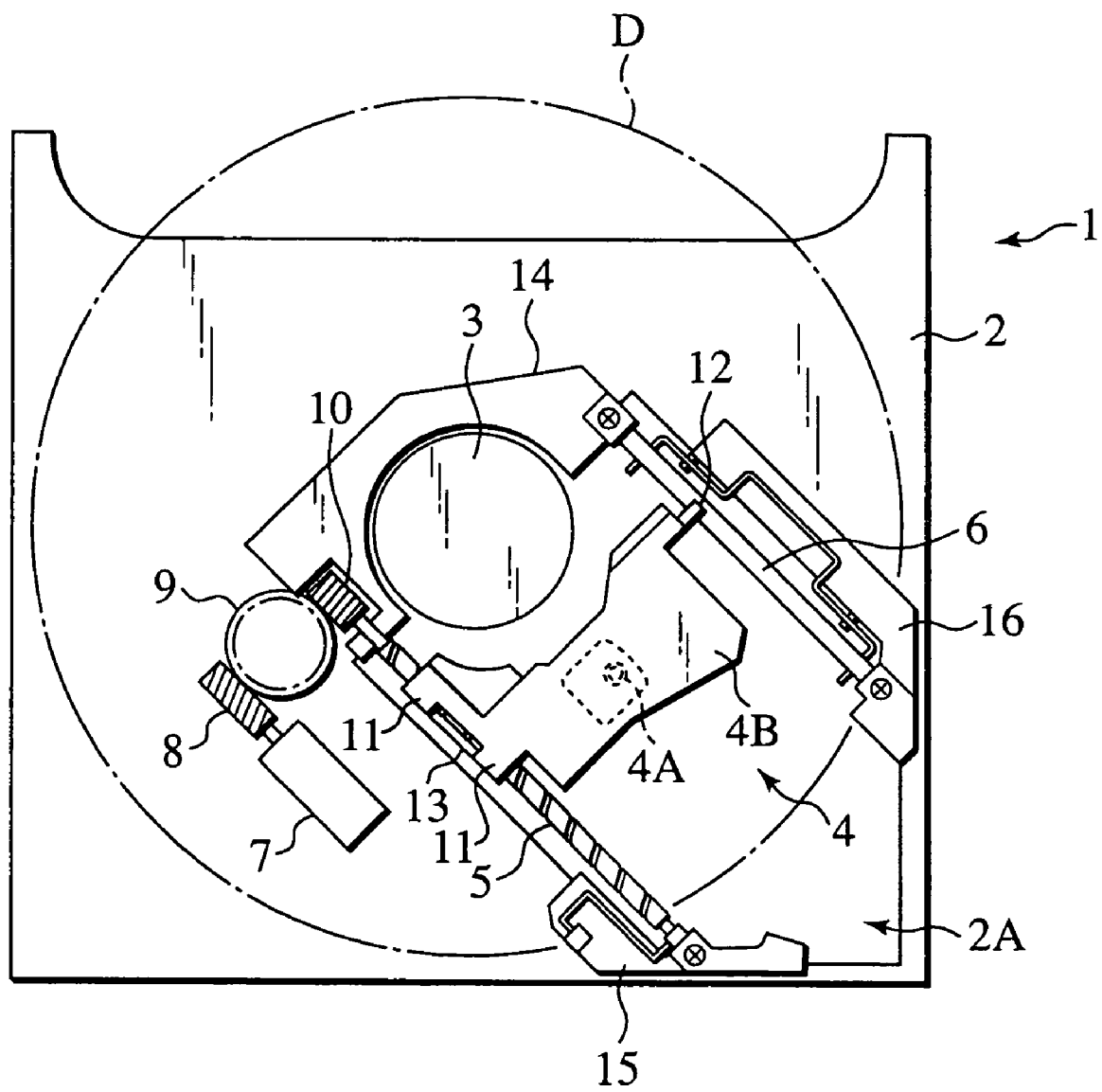
FIG. 3 is a schematic view of a bottom surface of a drive unit constituting a media driving apparatus according to the present invention.

A description will be in detail given below of an embodiment according to the present invention with reference to the accompanying drawings. As shown in FIG. 3, a turn table 3, an optical pickup 4, and the like are integrally provided on a base plate 2, and these components consist a drive unit 1. The turn table 3 is structured such as to rotate a disc-shaped media D such as a CD and a DVD, and a laser beam is irradiated from the pick up 4 to a flat surface (an information recording surface) of the media D mounted on the turn table 3 in order to read/write the information on/to the media D. A laser diode (not shown) producing a laser beam, a photo diode (not shown) detecting a reflected light from the media and the like, and an objective lens 4A for converging the laser beam to the information recording surface of the media D consist an optical part, and the optical part is mounted to a metal carriage 4B. The optical part on the metal carriage 4 comprises the optical pickup 4. The optical pickup 4 is moved in a radial direction of the media D along the information recording surface of the media D. In this case, in the base plate 2, a moving area of the optical pickup 4 is notched as an opening portion 2A, whereby the laser beam irradiated toward the media D on the turn table 3 from the optical pickup 4 is not shielded by the base plate 2.

Reference numeral 5 denotes a screw axis for moving the optical pickup 4 in the radial direction of the media D, and reference numeral 6 denotes a guide axis for guiding the screw axis 5. The screw axis 5 and the guide axis 6 are provided in parallel to the base plate 2 with respect to the optical pickup 4. Further, the optical pickup 4 is supported in both sides thereof by the screw axis 5 and the guide axis 6, and moves in the axial direction of the screw axis 5 based on a rotational drive of the screw axis 5 supported in one side.

Reference numeral 7 denotes a driving source (a motor) for rotating the screw axis 5. A motor gear 8 (a worm gear) is fixed to a drive axis of the motor 7, and the base plate 2 is provided with a reduction gear 9 (a worm wheel) which is engaged with the motor gear 8. Further, a driven gear 10 (a worm gear) for obtaining a rotation driving force from the motor 7 is fixed to one end side of the screw axis 5, and the driven gear 10 is engaged with the reduction gear 9. On the other hand, fitting portions 11 and 12 to which the screw axis 5 and the guide axis 6 passes therethrough are formed in both sides of a carriage 4B constituting the optical pickup 4. A rack 13 is mounted to the fitting portion 11 through which the screw axis 5 is inserted, and the rack 13 is engaged with the screw axis 5.

Accordingly, when driving the motor 7 so as to rotate the screw axis 5 in a forward rotating direction/a backward rotating direction, the carriage 4B carries out a reciprocating linear motion along the screw axis 5 and the guide axis 6, whereby the optical pickup 4 including the carriage 4B is moved in the radial direction of the media D. In this case, strike plates 14, 15 and 16 for bridging between the screw axis 5 and the guide axis 6 are mounted to the base plate 2.

Figure 4:
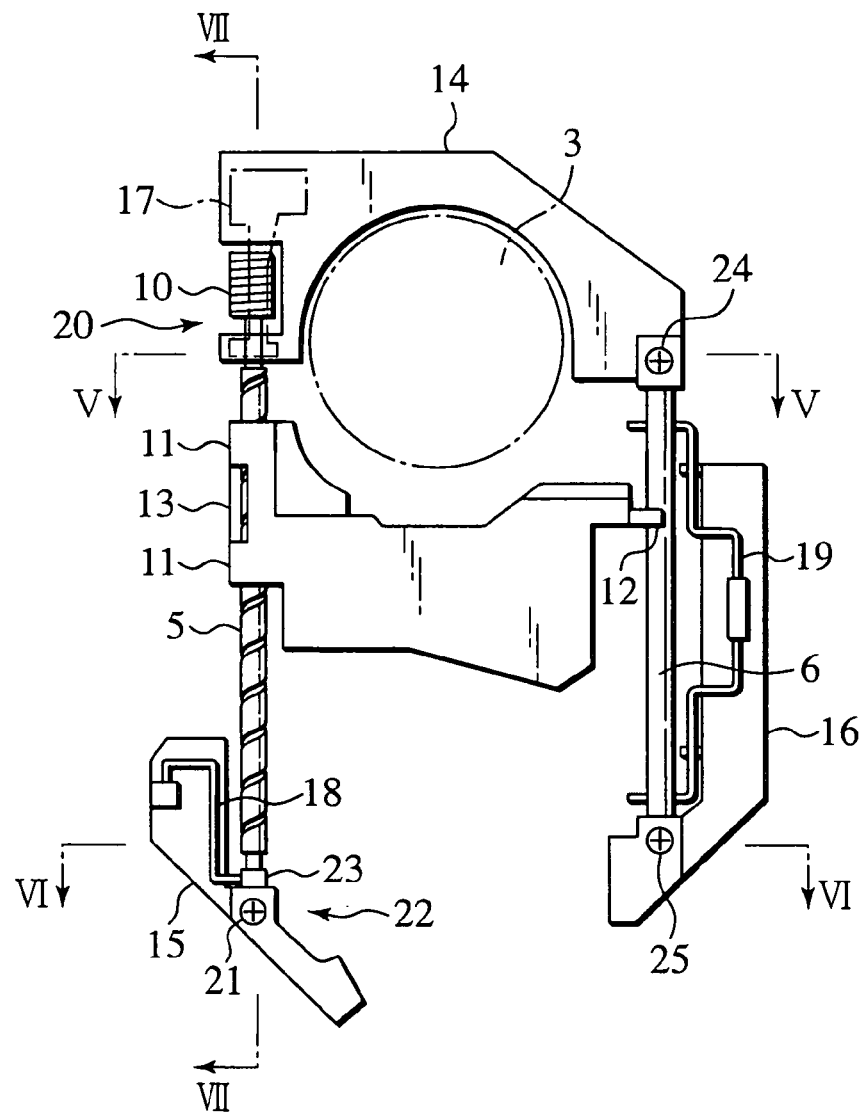
FIG. 4 is an enlarged view of a main portion in FIG. 3.
Figure 5:
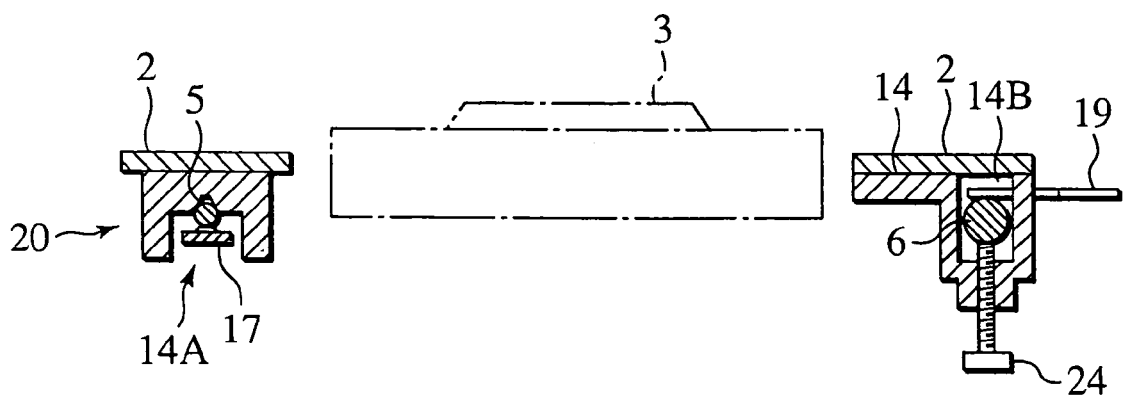
FIG. 5 is a schematic view of a cross section along a line V—V in FIG. 4.
Figure 6:
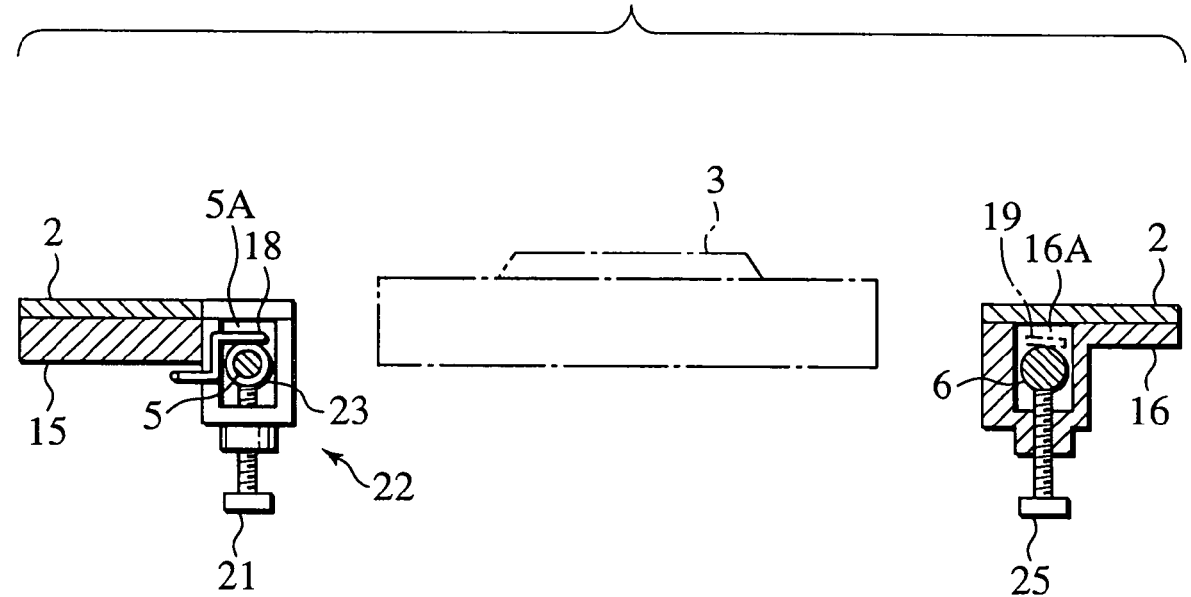
FIG. 6 is a schematic view of a cross section along a line VI—VI in FIG. 4.

FIG. 4 is a partly enlarged view in FIG. 3, and FIGS. 5 and 6 show a cross section along a line V—V and a cross section along a line VI—VI in FIG. 4, respectively. As shown in FIG. 4, an elastic member 17 (a first elastic member) constituted by a leaf spring is mounted to the strike plate 14 surrounding the turn table 3, and one end portion of the screw axis 5 is pressed in the axial direction of the turn table 3 (in the present embodiment, a direction moving close to the media D on the turn table 3) in the driven gear 10 side by the elastic member 17. Further, an elastic member 18 (a second elastic member) constituted by a linear torsion spring is mounted to the strike plate 15, and another end portion of the screw axis 5 is pressed in the axial direction of the turn table 3 (in the present embodiment, in a direction moving apart from the media D on the turn table 3) by the elastic member 18.

Further, an elastic member 19 constituted by a linear torsion spring is mounted to the strike plate 16, and both end portions of the guide axis 6 are pressed in the axial direction of the turn table 3 (in the present embodiment, in the direction moving apart from the media D on the turn table 3) by the elastic member 19.

As shown in FIGS. 5 and 6, recess portions 14A, 14B, 15A and 16A to which the end portions of the screw axis 5 and the guide axis 6 are fitted are formed in the strike plates 14, 15 and 16. And a supporting portion 20 (a first supporting portion) which supports one end of the screw axis 5 by bringing the elastic member 17 into slidable contact with an outer peripheral surface of the screw axis 5 is structured in an opening side of the recess portion 14A to which one end portion of the screw axis 5 is fitted. Further, a supporting portion 22 (a second supporting portion) which supports another end portion of the screw axis 5 by making a tilt adjusting screw 21 to oppose to the elastic member 18 mentioned above is structured in the strike plate 15 forming the recess portion 15A. In particular, the elastic member 18 and the tilt adjusting screw 21 oppose to each other with holding a collar 23 (a bearing) therebetween, and the structure is made such that one end portion of the screw axis 5 is rotatably fitted to the collar 23. In this case, the elastic member 18 is in contact with an outer peripheral surface of the collar 23 so as to press the collar 23 toward the tilt adjusting screw 21, and the tilt adjusting screw 21 is screwed toward a bottom surface of the recess portion 15A, whereby a leading end thereof is brought into contact with the outer peripheral surface of the collar 23.

Accordingly, the collar 23 can be displaced between the elastic member 18 and the tilt adjusting screw 21 while keeping the collar 23 in a state in which the collar 23 is in contact with the leading end of the tilt adjusting screw 21.

By rotating the tilt adjusting screw 21, it is possible to change the tilt of the screw axis 5 to which one end portion is fitted to the collar 23, with respect to the information recording surface of the media D on the turn table 3.

On the other hand, second and third tilt adjusting screws 24 and 25 capable of adjusting the tilt of the guide axis 6 are screwed into bottom surfaces of the recess portions 14B and 16A to which both ends of the guide axis 6 are fitted, both end portions of the guide axis 6 are pressed toward the screws 24 and 25 by the elastic member 19, and leading ends of the screws 24 and 25 are brought into contact with the outer peripheral surface of the guide axis 6 based on an elastic force of the elastic member 19. Accordingly, the guide axis 6 can be adjusted in the tilt with respect to the information recording surface of the media D based on the rotating operation of the tilt adjusting screws 24 and 25.

Figure 7:
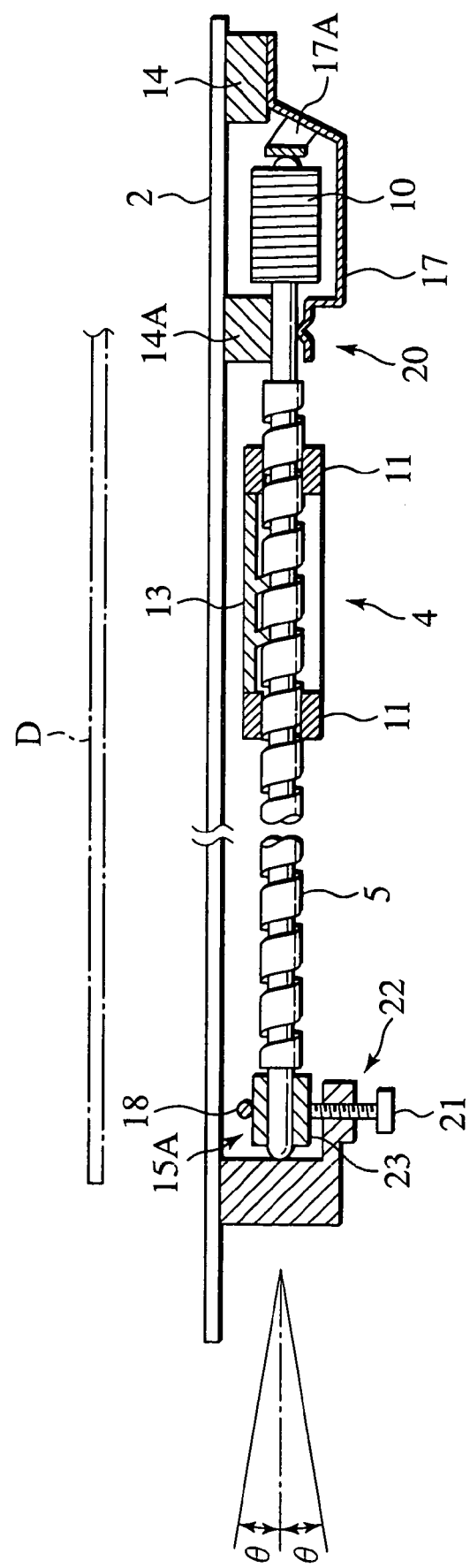
FIG. 7 is a schematic view of a cross section along a line VII—VII in FIG. 4.

Next, FIG. 7 shows a partly cross sectional view along a line VII—VII in FIG. 4. As is apparent from the drawing, the elastic member 17 is provided so as to bridge over the driven gear 10. The leading end of the elastic member 17 is brought into slidable contact with the outer periphery of one end portion in the screw axis 5, and one end portion of the screw axis 5 is rotatably clamped by the elastic member 17 and the recess portion 14A. Further, a part of the elastic member 17 (a branch piece 17A) is brought into contact with one end surface of the screw axis 5, and the screw axis 5 is pressed in the axial direction of the screw 5 by the branch piece 17A. On the other hand, the one end of the screw 5 coated with the collar 23 is brought into contact a wall surface of the recess portion 15A, whereby the movement of the screw 5 is restricted in the axial direction of the screw axis 5.

Figure 1:
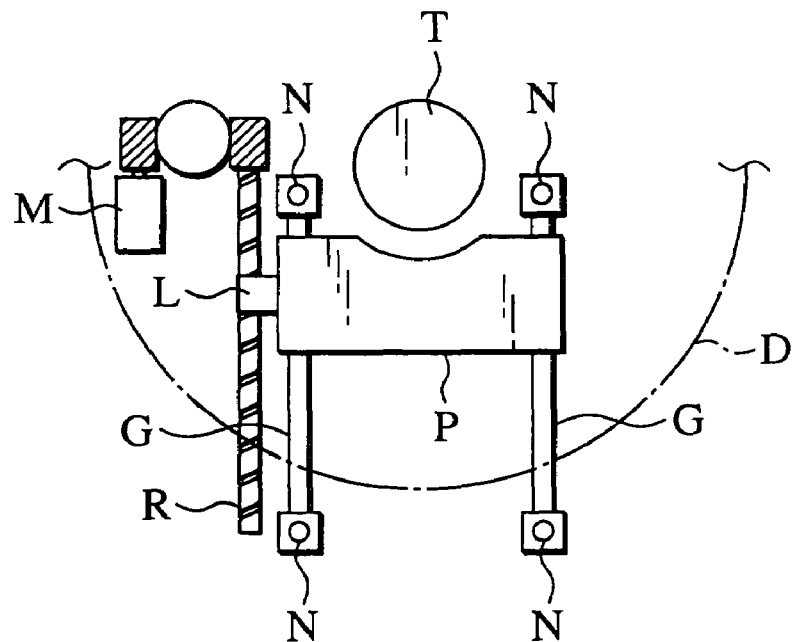
FIG. 1 is a schematic view showing a related art.
Figure 2:
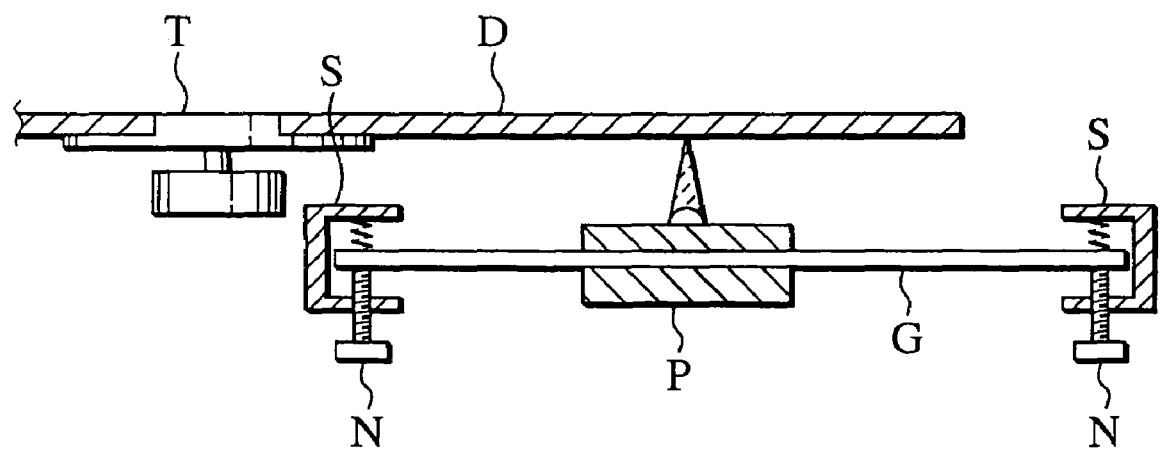
FIG. 2 is an enlarged schematic view showing a main portion of the related art.

According to the screw axis 5 mentioned above in which both end portions thereof are supported by the supporting portions 20 and 22, it is possible to change the tilt based on the rotating operation of the tilt adjusting screw 21, and it is possible to compensate a tilt θ of the media D mounted on the turn table 3 with respect to the information recording surface within an acceptable range. Further, since the screw axis 5 oscillates around the supporting portion 20 in a reverse side to the tilt adjusting screw 21 at a time of operating the tilt adjusting screw 21, a displacement amount of the driven gear 10 is small, and it is possible to maintain the engagement between the driven gear 10 and the reduction gear 9 shown in FIG. 1 in a proper state.

A description will be given here of an operation of the media driving apparatus structured as mentioned above. The turn table 3, the optical pickup 4 and the like are assembled in the base plate 2 so as to constitute the drive unit 1. However, the constituting parts thereof are not necessarily assembled to the predetermined positions in the proper attitudes. In particular, in the case that the turn table 3 and the optical pickup 4 are assembled in such a manner that their relative tilt is more than the acceptable range, the laser beam irradiated to the information recording surface of the media D arranged in the turn table 3 from the optical pickup 4 is largely tilted and the reflected light thereof cannot be detected. Accordingly, in the case that the relative tilt between the turn table 3 and the optical pickup 4 is more than the acceptable range, it is necessary to adjust so as to compensate the tilt.

In the case that the turn table 3 is tilted with respect to the axial direction of the screw axis 5 and the guide axis 6, it is set by rotating the tilt adjusting screws 21, 24 and 25 such that the screw axis 5 and/or the guide axis 6 are parallel to the information recording surface of the media D on the turn table 3. Accordingly, it is possible to perpendicularly irradiate the laser beam to the information recording surface of the media D so as to securely detect the reflected light, while moving the optical pickup 4 in parallel along the radial direction of the media D.

In this case, since the leading end of the tilt adjusting screw 21 is brought into contact with the outer surface of the collar 23 and one end portion of the screw axis 5 is rotatably supported in the inner peripheral surface of the collar 23, it is possible to prevent the leading end of the tilt adjusting screw 21 and the screw axis 5 from being worn so as to maintain the tilt of the optical axis with respect to the media in an initial set state for a long time.

Further, since the bearing (the collar 23) is displaced according to the rotating operation of the tilt adjusting screw 21, and the tilt of the screw axis 5 is directly changed based on the displacement amount, it is possible to widely improve the adjusting accuracy in comparison with the structure in which the tilt of the screw axis 5 is indirectly changed via the traverse base as in the related art mentioned above. Further, according to the present invention, since the structure is made such that the optical pickup 4 is supported by two elements comprising the screw axis 5 and the guide axis 6, it is possible to make the apparatus compact, simple and inexpensive, in comparison with the media driving apparatus having the three-axes structure in which the optical pickup is supported by two guide axes independent from the screw axis.

As mentioned above, the present invention is described, however, the media driving apparatus according to the present invention is not limited to the example mentioned above, and for example, a ball bearing or the like may be utilized as the bearing in place of the collar 23. Further, the structure may be made such that the bearing is provided in both ends of the screw axis 5, and the first supporting portion has the same structure as that of the second supporting portion. In this case, the elastic members 18 and 19 constituted by the linear torsion spring may employ a leaf spring.

What is claimed is:

1. A media driving apparatus for moving an optical pickup in a radial direction of a disc-shaped media arranged on a turn table, comprising:

a base plate;

a screw axis and a guide axis which are provided in parallel to the base plate and support both sides of the pickup, in which the optical pickup moves in the radial direction of the disc-shaped media based on a rotation of the screw axis;

a driving source which applies a rotation driving force to the screw axis;

a driven gear which is provided in a first end portion side of the screw axis, and provided for obtaining the rotation driving force from the driving source;

a bearing in which the screw axis is rotatably fitted to a second end portion side of the screw axis;

a first supporting portion which is mounted to the base plate and supports the first end portion side of the screw axis;

a second supporting portion which is mounted to the base plate and supports the second end portion side of the screw axis;

a first elastic member which is mounted to the first supporting portion and presses the screw axis in an axial direction of the turn table;

a second elastic member which is mounted to the second supporting portion and presses the screw axis in the axial direction of the turn table via the bearing; and a tilt adjusting screw which is opposed to the second elastic member with respect to the bearing, wherein the bearing is displaced between the tilt adjusting screw and the second elastic member by operating the tilt adjusting screw so as to rotate, and a tilt of the screw axis is changed with respect to the information recording surface of the disc-shaped media in correspondence to an amount of displacement of the bearing.

2. A media driving apparatus according to claim 1, wherein the axial direction in which the first elastic member presses is an opposite direction to the axial direction in which the second elastic member presses.

3. A media driving apparatus according to claim 2, wherein the axial direction in which the first elastic member presses is a direction moving close to the disc-shaped media arranged on the turn table, and the axial direction in which the second elastic member presses is a direction moving apart from the disc-shaped media arranged on the turn table.

* * * * *